Patented Aug. 1, 1939

2,167,638

UNITED STATES PATENT OFFICE 2,167,638

COATING COMPOSITION FOR SHEET METAL CONTAINERS

Berton S. Clark, San Francisco, Calif., assignor to American Can Company, New York, N. Y., a corporation of New Jersey No Drawing. Application October 17, 1934, Serial No. 748,759

2 Claims. (Cl. 134—3)

This invention relates in general to a composition of matter and more particularly, to an improved coating composition for beer or other containers.

It is well known amongst beer brewers and others interested in the brewing, handling and sale of beer in containers lined with coatings comprising pitch, or asphalt, or resin, or like substances, that when the beer is packed in such coated containers and remains therein for an appreciable space of time, the flavor of the beer and especially the hop flavor of the beer, is lost from the beer or greatly reduced with the result that such beer has an unsatisfactory taste or flavor. It has been found that this loss or reduction of flavor is due to its being taken up or absorbed by the coating or enamel or lacquer.

The present inventor conceived the idea that by incorporating in or mixing with a suitable coating material obtainable in the market, a concentrated hop flavor material such as lupulin in the proper proportions, this loss or deterioration of flavor could be substantially prevented and subsequent experiments and tests have proved that such loss or deterioration of flavor not only is substantially inhibited but the flavor of the beer is substantially improved and the exact flavor desired can be predetermined fairly accurately and rendered constant.

An object of the present invention, therefore, is the provision of a coating composition for beer containers such as tin cans, glass bottles, metal kegs, or drums, wooden kegs, storage or shipping tanks, or the like, which comprises a carrier such as an asphalt or pitch base to keep the beer from contact with the container walls and has incorporated in the carrier a flavoring material characterized by its capability to prevent or inhibit loss of flavor, especially the bitter or hop flavor of the beer, during packing, shipping and storage of the beer.

Another object of the invention is the incorporation or impregnation of a flavor in coatings, enamels or lacquers of beer containers which is derived from the same source as the flavor of the beer, the loss or deterioration of which it tends to prevent or inhibit.

Another object of the invention is the provision of such a flavor stabilizing ingredient for beer container coatings which is preferably derived from the hop flower or hop cone and which is commonly known as lupulin.

Another object of the invention is the provision of a flavoring material for the aforementioned purposes which readily mixes with carriers such as asphalt or pitch or resin enamels or lacquers and forms with the latter a finished coating material which may be readily and economically applied to the interior surfaces of beer containers by flowing, spraying, brushing or dipping.

Still another object of the invention is the homogeneous combination of a flavoring material derived from the hop plant with a coating composition or carrier which is adapted after coating to dry readily at low temperatures, thereby avoiding interference with container making and decorating operations which cannot stand high baking temperatures.

Still another object of the invention is the provision of a coating material for beer containers having the aforementioned characteristics and which, when applied to the inner surfaces of metal containers, prevents chemical reaction between the beer and the metal and when applied to glass containers tends to reduce or inhibit the deleterious effect of light upon the contents, while at the same time stabilizing the flavor of the beer contained in said containers.

Numerous other objects and advantages of the invention will be apparent as it is better understood from the following description which discloses a preferred embodiment thereof.

There are a number of coating compositions which are suitable for beer containers and with which the present invention may be readily practiced.

Assuming for the purpose of illustration, that a tin can, because of its cheapness, opaqueness and other advantages, is the preferred form of beer container, a satisfactory composition of coating material for such a container is made according to the following formula. Furthermore, in order to obtain a convenient supply of such coating material having the desired consistency and viscosity, the following procedure may be followed:

400 lbs. of petrolastic asphalt, having a melting point of 212° F., are thrown into a pot or kettle with 200 lbs. of brilliant black "gilsonite", having a melting point of 400° F. They are heated together until they readily mix and until a temperature of 525° F. is attained by the mixture. After thoroughly stirring or agitating this molten mixture, the mixed mass is permitted to cool to room temperature. The resulting mixed and cooled product has then a melting point of approximately 270° F.

460 lbs. of this mixture are then dissolved in 540 lbs. of ethylene dichloride or other suitable solvent. This will yield about 95 gallons of a carrier suitable for mixture with the flavoring material or extract more particularly described below.

I have found that the best flavoring material to counteract the tendency of pitch or asphalt or like coating materials to take up or absorb the bitter or hop flavor from the beer, is a derivative of the hop flower. This hop flavoring material is generally known as lupulin. Lupulin is a bright yellowish brown granular powder of characteristic odor and taste of hops and consisting of the glandular trichomes from the strobiles of *Humulus lupulus*. It can be bought in the open market in powder form.

To prepare a solution or extract of this lupulin flavoring material which will contain approximately 14% lupulin by weight, mix a suitable amount of commercial lupulin, for example, approximately 2 lbs. with one gallon of ethylene dichloride and remove foreign and insoluble substances by filtering. Since the commercial lupulin now available in the market varies somewhat in the percentage of soluble and insoluble ingredient allowance must be made for this variance in the amount of commercial lupulin mixed with the solvent.

To prepare the lupulin treated lacquer or coating material, mix this lupulin solution or extract with the asphalt or pitch base or carrier made according to the formula described above.

*Example*

Mix 100 lbs. of the pitch carrier (46% solids) described above with 36.5 lbs. of lupulin extract (approximately 14% solids) described above and add ethylene dichloride to reduce the viscosity of the mixture to substantially 23" at 70° F. in a Ford #3 viscosimeter having the length of the capillary opening reduced to $\frac{1}{32}$". This dilution should require about 19 lbs. of ethylene dichloride. When this treated lacquer or coating is applied to the inner surface of the beer container, the resulting lacquer film will contain approximately 10% lupulin by weight.

Extensive experiments and sample tests carried on by the inventor have shown that to substantially inhibit loss or deterioration of the hop flavor in beer and to produce an improved beer flavor approximately 10% of lupulin by weight is usually satisfactory. This percentage of lupulin by weight may be increased or decreased according to the degree of bitter flavor desired.

When a desired quantity of flavor impregnated coating material has been produced in accordance with the foregoing formula, the coating may then be applied to the inner surfaces of beer containers by various suitable and available methods, such as, by flowing, spraying, dipping, or brushing. The present inventor prefers the flow method. Preferably, two coats are applied to the inner surfaces of the beer container. The method used is immaterial so long as the inner surfaces of the container are thoroughly covered by the coating material so that no exposed parts are left.

Both the preferred pitch base and the preferred solvent hereinbefore described contribute to quick drying of the treated coating material at comparatively low temperatures. If the time element is of no consequence, ordinary room temperatures are sufficient to dry the coating in a relatively short time. If speed is a desideratum, a low temperature baking oven may be readily provided, many suitable types now being available. The low drying temperatures required have the advantages of avoiding interference with container making and decorating operations which cannot stand high baking temperatures.

It is well known that hops grown in different parts of the United States and in different parts of the world differ somewhat in quality and flavor or taste and by the choice of a particular grade or type of hop, a beer having a particular or desired flavor can be produced. Consequently, the choice of a particular grade or type of lupulin when homogeneously mixed with a suitable beer container coating will permit the predetermination of a wide range of beer flavors in the beer packed in containers coated in this manner.

It is thought that the invention and many of its attendant advantages will be understood from the foregoing description and it will be apparent that various changes may be made in the choice and arrangement of materials of the composition without departing from the spirit and scope of the invention or sacrificing all of its material advantages, the form hereinbefore described being merely a preferred embodiment thereof.

I claim:

1. A coating composition for lining the interior surfaces of beer, ale or like product sheet metal containers to inhibit reaction between the product and the metal and to inhibit absorption of product flavors by the coating, which comprises a mixture of asphalt and "gilsonite" in proportions substantially two to one by weight dissolved in a hydrocarbon solvent, and lupulin free of foreign and insoluble matter dissolved in a like solvent, the ultimate coating when applied to said containers and when dried being free of said solvents and having an effective lupulin content of from about five to ten percent by weight.

2. A coating composition for lining the interior surfaces of beer, ale or like product sheet metal containers to inhibit reaction between the product and the metal and to inhibit absorption of product flavors by the coating, which comprises a mixture of asphalt having a comparatively low melting point and "gilsonite" having a comparatively high melting point dissolved in a hydrocarbon solvent, and lupulin free of foreign and insoluble matter dissolved in a like solvent, the ultimate coating when applied to said containers and dried being substantially free of said solvents and having an effective lupulin content of from about five to ten percent by weight, said ultimate coating having a melting point substantially higher than the processing temperature of said product.

BERTON S. CLARK.